Feb. 18, 1969  E. L. BECKWITH  3,427,733
IONOMERIC RESIN STIFFENING ELEMENT
Filed Oct. 3, 1966

INVENTOR.
EDWIN L. BECKWITH
BY
Kenway, Jenney + Hildreth
ATTORNEYS

United States Patent Office 3,427,733
Patented Feb. 18, 1969

3,427,733
IONOMERIC RESIN STIFFENING ELEMENT
Edwin L. Beckwith, Harvard, Mass., assignor to Beckwith-Arden Inc., Watertown, Mass., a corporation of New Hampshire
Filed Oct. 3, 1966, Ser. No. 583,725
U.S. Cl. 36—68                               3 Claims
Int. Cl. A43b *13/42;* A43c *13/14*

ABSTRACT OF THE DISCLOSURE

Disclosed herein is a laminated shoe stiffener that includes a relatively thin sheet of thermoplastic hydrocarbon polymer resin having ionic cross linking bonds. The resinous sheet is bonded on one or both of its surfaces to a fabric sheet. The laminated stiffener is bondable to the integuments of a shoe upper by applying an adhesive between the upper and the fabric surface of the stiffener or by pressing the resinous surface of the stiffener to the upper under heat.

---

My invention relates to stiffening elements which may advantageously be utilized to form stiffener blanks for shoes and other items.

Stiffeners are utilized in many applications to provide rigidity and permanence of shape to all or part of an otherwise non-rigid shoe structure. For many applications it is desirable that the stiffener be both tough and resilient, and have a good elastic recovery in order that the stiffener may return to its initial shape after deformation. Heretofore these characteristics have been at least partly in contradiction, and an improvement in one characteristic was generally obtained only by a concomitant degradation in the other.

Examples of stiffening materials heretofore used are rubber or resin impregnated fabrics, stiff cardboard and the like. Cardboard, once commonly used in counters, suffers from being relatively inflexible when formed in sections adequate to provide sufficient rigidity. Moreover, it is readily damaged by moisture. Rubber is undesirable because it will degenerate and a shoe stiffened with it will tend to lose its shape in time. Other resins, usually used in very rigid stiffeners tend to suffer from a poor thermal coefficient, becoming brittle at low temperatures and soft at high temperatures. Subsequent attempts at the development of improved stiffening elements led to the utilization of polyethylene materials which exhibited improved qualities of toughness and flexibility; stiffening elements of this type, while a distinct improvement in the art, nevertheless did not possess the strength and elastic recovery characteristics now demanded for high quality stiffeners. Attempts to improve these characteristics by cross linking the polyethylene material by such techniques as adding peroxide to the polymer at elevated temperatures have been relatively unsuccessful since the resulting polymer became relatively intractable and could not subsequently be processed by the normal fabricating techniques such as by melt extrusion or injection molding.

The present invention is based upon my discovery that a specific type of thermoplastic material, which may be characterized as a thermoplastic resin polymer with ionic bonds, when used as a stiffener material, obviates the above disadvantages and possesses of itself unforseen and unpredictable advantages as a stiffener that combine to make it unique in this respect.

Specifically, I have found that an improved stiffener of markedly superior qualities may be formed by extruding onto one or more layers of a woven or unwoven fabric a relatively thin layer of a thermoplastic hydrocarbon polymer resin having ionic bonds to form an integral stiffening element. This material, which will hereinafter be referred to as an "ionomeric resin" due to the incorporation therein of ionic bonds in a thermoplastic polymer resin, may be more fully described as an ionic copolymer selected from the class consisting of polymers of α-olefins having the general formula $RCH=CH_2$ where R is a radical selected from the class consisting of hydrogen and alkyl radicals having from 1 to 8 carbons atoms, the olefin content of the polymer being at least 50 mol percent, based on the polymer, and an α,β-ethylenically unsaturated monocarboxylic acid, the acid monomer content of the polymer being from 0.2 to 25 mol percent, based on the polymer, the monomer-carboxylic acid polymer containing uniformly distributed through the polymer a metal ion having a valence of 1 to 3 inclusive, and polymers of said olefin content and a α,β-ethylenically unsaturated dicarboxylic acid, the acid content of the polymer being from 0.2 to 25 mol percent based on the polymer, the dicarboxylic acid copolymer containing uniformly distributed throughout the polymer a monovalent metal ion, in which at least 10 percent of the carboxylic acid groups of the monovalent and divalent carboxylic acid polymers are neutralized by the metal ions. A further explanation of the nature of the above ionomeric resin and methods of producing it is contained in U.S. Patent No. 3,264,272 issued Aug. 2, 1966 to Richard W. Rees.

This material, which is now commercially available under the trademark "Surlyn A," a registered trademark of the E. I. du Pont de Nemours and Company, and which has been primarily promoted for use as a packing film and as an electrical insulating cover for wire, has surprising characteristics when utilized as a stiffening material. Among the advantages of this material when used as a stiffener are its excellent flow characteristics when processed at relatively low temperatures (of the order of 160° F. to 200° F.) when subjected to a working stress, and its resistance to flow at both low and elevated temperatures in the absence of a working stress. Unlike many resins heretofore employed in stiffeners, this material when heated does not exhibit elastic recovery characteristics which tend to cause it to revert to a prior form.

Another advantage of the ionomeric resin described above is its remarkable adhesive action with respect to a wide variety of materials when heated and subjected to a working stress. This characteristic allows the resin to be intimately incorporated into a fabric to form a composite structure having all the desirable characteristics of the resin material while having the ability to be heat sealed to other materials.

A further advantage of stiffeners formed from the above material is their increased toughness, resilience, and bend recovery properties for a given weight of ionomeric resin together with a marked improvement in the processing characteristics of the resin material. It is generally recognized that improved strength characteristics, together with an improved memory, can be obtained in polymer resins by cross linking the polymers to form larger molecules. These improved properties are, however, purchased at the expense of an increased difficulty in working or forming the materials. In ionomeric resins of the type described herein, however, the nature of the bonding is such that in the absence of a working stress the bonds between the polymer chains impart the expected improvement in strength and other characteristics to the material, while in the presence of a working stress the bonds are easily broken to permit working of the material, after which the bonds will again reform when the working stress is removed.

The stiffening element of my invention may be used in a wide variety of applications to provide a resilient stiffener having improved characteristics of strength and elastic recovery, crease resistance even under pressure, temperature stability and moisture insensitivity. These elements will be found especially useful in the shoe industry as providing an improved stiffener for box toes and counters due to the ability to obtain the necessary strength and recovery characteristics with stiffeners of substantially thinner dimensions than heretofore practicable and due to its adhesive qualities.

Accordingly, it is an object of my invention to provide an improved resilient stiffening element formed from a thermoplastic ionomeric resin which may readily be fabricated.

Another object of my invention is to provide an improved stiffening element of this type which may readily be adhesively secured to other materials, such as the integuments of a shoe upper.

Still another object of my invention is to provide an improved shoe stiffener which may readily be incorporated into a shoe without the use of additional adhesives.

The above and other and further objects and features of my invention will become more readily apparent when taken in connection with the detailed description of the drawings in which.

Figure 1:
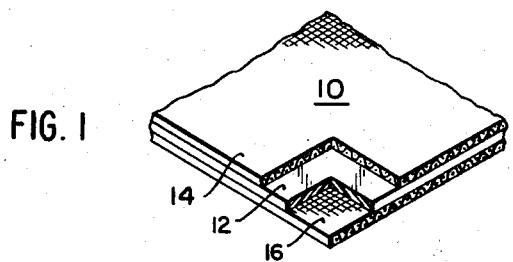
FIG. 1 is a diagrammatic view, with sections partially cut away, of an improved stiffening element formed in accordance with my invention.

Referring now to FIG. 1, there is shown a stiffening element 10 comprising an intermediate layer 12 of a thermoplastic ionomeric resin which is interposed between, and initimately bonded on opposite faces to, layers or plies of fabric 14 and 16 respectively. The layers 14 and 16 may comprise a porous or waterlaid felt or a woven fabric of single or multiple ply. The edges of the composite structure are cut away to show the structure of the stiffening element more clearly. The nature and thickness of the fabric will be determined by the use to which the stiffening element 10 is to be applied. In general, it is desirable that at least one side of the element 10 comprise a woven fabric of intimately arranged fibers in order that the thermoplastic resin may extend between the fibers and be intimately bonded to it.

The layer 12 of thermoplastic resin may advantageously be formed by an extruded sheet which, immediately after extrusion, is brought into contact on its opposite faces with rolls of fabric which are to be bonded to the sheet 12, the composite resin and fabric structure then being fed directly to a pair of calender rolls for pressure bonding. It is important that this pressure be applied immediately after extrusion while the resin sheet 12 is still in a highly viscous state in order that the sheet 12 may be firmly and intimately bonded to the fabric layers 14 and 16. The resulting stiffening element may then be cooled and cut to any desired shape, the presence of the fabric layers 14 and 16 insuring that the stiffening element can readily be attached to other elements by means of adhesives applied to the fabric surfaces. It will be noted in this respect that the use of a relatively fibrous fabric on either of the surfaces 14 and 16 will greatly assist in providing a strong adhesive bond between the stiffening element 10 and the element to which it is to be attached. The degree of bonding is readily controlled by adjusting the temperature of the resin and the pressure applied to it over the fabric.

The intermediate layer 12 is formed from a thermoplastic resin polymer having ionic bonds as described in the Rees patent discussed above. The resin is basically a polymer which is linked by ionic forces as well as by covalent bonds. The base polymer is an α-olefin chain to which ionized carboxyl groups are attached, the carboxyl groups being linked to metallic ions such as sodium, potassium, calcium, magnesium, and zinc. The presence of these metal ions alters the crystal structure of the material and introduces surprising characteristics into the material. In particular, the strength, crease resistance, abrasion resistance, elastic recovery, temperature stability and other properties apparent in a stiffener are greatly improved. In addition, the material can readily be fabricated at relatively low melting temperatures in the presence of a working stress; in the absence of this working stress, the material will not deform. This characteristic is utilized to advantage in one form of my invention which will be described below. Although the thickness of the layer 12 will be determined by the use which is to be made of the stiffening element 10, the thickness may advantageously be in the range of from 0.001 to 0.100 inch.

The structure shown in FIG. 1 is particularly appropriate when it is desired to secure the stiffening elements between other elements by means of adhesives on both sides of the stiffening element. The presence of a fabric layer on both sides of the intermediate resin layer readily allows this to be accomplished. In certain cases, however, it is desirable to dispense with the process of adhesively attaching the stiffener to the element in which it is to be used. Thus, for example, in the manufacture of shoes, it is often desirable to incorporate the stiffener, in the form of a box toe or a counter, directly into the upper of a shoe. I have found that an improved shoe stiffening element may be formed from an extruded sheet of the thermoplastic ionomeric resin described herein by coating this sheet with fabric on one side of the resin sheet only, the remaining side being exposed for subsequent incorporation directly into the shoe without adhesive.

Figure 2:
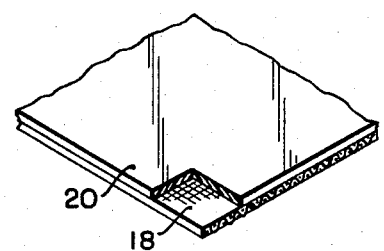
FIG. 2 is a similar view, with portions partially cut away, of an alternative form of stiffening element made in accordance with my invention which is particularly appropriate for use in shoes.

A stiffening element of this type is shown in FIG. 2 of the drawings in which a fabric sheet 18 is intimately bonded to one side only of a thermoplastic ionomeric resin sheet 20 in extruded form. Stiffeners of the appropriate size and shape may then be died out of the composite sheet shown in FIG. 2 to form the appropriate stiffeners for shoes.

Figure 3:
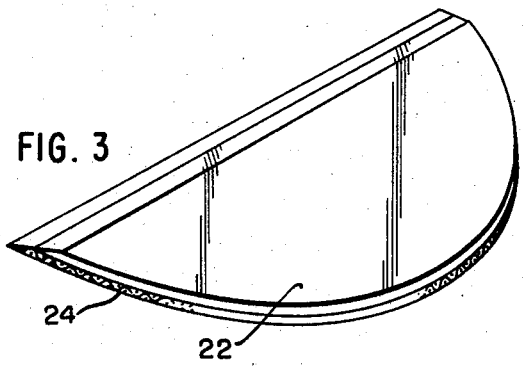
FIG. 3 is a pictorial view of the stiffening element of FIG. 2 in the form of a box toe which is skived and ready for attachment to a shoe upper.

One example of a stiffener of this type is shown in FIG. 3 of the drawings which illustrates a box toe blank having an upper layer 22 of ionomeric resin of the type described above intimately bonded to a lower layer 24 of the fabric material. The rear edge of the box toe blank of FIG. 3 is skived in a known manner to provide a tapered stiffness to insure the comfort of the wearer and appearance of the shoe in which the blank is incorporated.

The stiffener of this invention may be bonded directly to the upper, either by cementing a fabric side to the upper leather or by heat sealing the resin to the leather by pressing on a hot plate maintained at about 450–500° F. momentarily so that the resin fuses and bonds to the leather.

In assembling into a shoe, the upper and stiffener are arranged in the conventional manner, and then heated to about 160°–300° F. to soften the stiffener prior to lasting. When lasted, the stiffener becomes permanently molded to its proper form, which it maintains very durably without damage by heat, cold or moisture. It should here be noted that the stiffener is not rigid, but permits temporary deformation of the stiffened part under stress, serving to restore it to its lasted form when the stress is removed.

Although I have illustrated a box-toe stiffener which utilizes the stiffening element of FIG. 2 of the drawings, it will be understood that such a stiffener may also utilize the stiffening element of FIG. 1, although such a stiffener will not, of course, have the self-adhesive property of the stiffening element of FIG. 2. It will also be understood that other shoe stiffening elements, such as counter stiffeners, may also be formed from the stiffening elements of FIG. 1 or FIG. 2.

It will thus be seen that I have provided an improved stiffening element and structural member. In particular, it will be seen that I have provided an improved stiffening element which has the characteristics of light weight, high strength (reduced thickness for given strength), resilience, far superior elastic recovery, temperature stability, water resistance and crease resistance, and which is particularly well suited as a shoe stiffener which may, if desired, be incorporated directly into the shoe without the need for additional adhesives.

Having described and illustrated a preferred embodiment of my invention, I claim:

1. A resilient fabricized stiffening element comprising at least one sheet of relatively thin fabric material adhesively bonded to a relatively thin extruded sheet of a thermoplastic ionomeric resin containing a plurality of carboxylic acid groups having metal ions attached thereto, said resin sheet having an initial thickness of from 0.001 to 0.100 inch.

2. The stiffening element defined in claim 1 including a pair of relatively thin sheets of fabric material intimately bonded to opposite sides of said resin sheet.

3. A shoe stiffener comprising a resilient fabricized stiffening element having a sheet of relatively thin fabric material adhesively bonded to a relatively thin extruded sheet of a thermoplastic ionomeric resin containing a plurality of carboxylic acid groups having metal ions attached thereto, said resin sheet having an initial thickness of from 0.001 to 0.100 inch and having a softening temperature in the range of from 160° to 300° F., said resin sheet being directly bondable to the upper of a shoe and being self-adhesive to said upper when joined thereto by means of heat and pressure.

References Cited

UNITED STATES PATENTS

| | | | |
|---|---|---|---|
| 2,492,413 | 12/1949 | Brophy | 12—146 |
| 2,611,195 | 9/1952 | Brophy et al. | 36—68 |
| 2,618,796 | 11/1952 | Brophy | 36—68 X |
| 2,734,289 | 2/1956 | Heaton et al. | 36—68 |
| 3,113,906 | 12/1963 | Hamilton | 36—68 X |
| 3,115,651 | 12/1963 | Kamborian | 12—146 |
| 3,170,252 | 2/1965 | Ravich | 36—68 |
| 3,264,272 | 8/1966 | Rees. | |

ALFRED R. GUEST, *Primary Examiner.*

U.S. Cl. X.R.

36—77